US009582307B2

(12) United States Patent
Barabash et al.

(10) Patent No.: US 9,582,307 B2
(45) Date of Patent: Feb. 28, 2017

(54) EFFICIENT DATA TRANSMISSION IN AN OVERLAY VIRTUALIZED NETWORK

(71) Applicant: International Business Machines Corporation, Armonk, NY (US)

(72) Inventors: Katherine Barabash, Haifa (IL); Thomas R Parker, Haifa (IL); Liran Schour, Harduf (IL)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/665,944

(22) Filed: Nov. 1, 2012

(65) Prior Publication Data

US 2014/0119373 A1 May 1, 2014

(51) Int. Cl.
*G06F 9/455* (2006.01)

(52) U.S. Cl.
CPC ........... *G06F 9/45558* (2013.01); *G06F 2009/45595* (2013.01)

(58) Field of Classification Search
None
See application file for complete search history.

(56) References Cited

U.S. PATENT DOCUMENTS

| 2009/0238190 | A1* | 9/2009 | Cadigan, Jr. | .......... | H04L 12/462 |
| | | | | | 370/395.53 |
| 2011/0075667 | A1* | 3/2011 | Li et al. | .......... | 370/392 |
| 2012/0327952 | A1* | 12/2012 | Huang | .......... | H04L 12/413 |
| | | | | | 370/419 |
| 2014/0119373 | A1* | 5/2014 | Barabash | .......... | G06F 9/45558 |
| | | | | | 370/392 |
| 2014/0123133 | A1* | 5/2014 | Luxenberg | .......... | H04L 67/322 |
| | | | | | 718/1 |

FOREIGN PATENT DOCUMENTS

| CN | 1947390 A | 4/2007 |
| CN | 101322374 A | 12/2008 |
| CN | 102577255 A | 7/2012 |
| CN | 103812777 A | 5/2014 |
| TW | 201424302 A | 6/2014 |

OTHER PUBLICATIONS

Narten, et al., "Problem Statement: Overlays for Network Virtualization draft-narten-nvo3-overlay-problem-statement-01", Internet Engineering Task Force, Internet-Draft, Intended status: Informational, Expires: May 3, 2012.

* cited by examiner

*Primary Examiner* — Adnan Baig
(74) *Attorney, Agent, or Firm* — Bryan D. Wells; Suzanne Erez; David M. Quinn

(57) ABSTRACT

Machines, systems and methods for data transmission in a data communications network are provided. The method comprises receiving a data packet for transmission, the data packet having a first header portion and a second header portion, wherein the first header portion comprises an identifier indicating that any information in the first header portion is not to be used; and determining destination information comprising at least a physical address of a destination in the data communications network to which the data packet is to be transmitted based on information included in the second header portion.

20 Claims, 7 Drawing Sheets

EFFICIENT DATA TRANSMISSION IN AN OVERLAY VIRTUALIZED NETWORK

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data transmission in a virtualized computing environment and, more particularly, to a system and method for data transmission in a virtualized computing environment having a virtual machine and a hypervisor.

BACKGROUND

In a virtualized computing network, a network node may be implemented as a virtual machine (VM) that is hosted by a hypervisor. Typically, a VM is executed so that the VM is unaware of the underlying physical platform on which the VM and the hypervisor operate. That is, the hypervisor provides the VM with a virtualized operating platform or interface so that the VM functionality does not have to be customized or modified to meet the requirements of the underlying hardware or machine.

Referring to FIG. 1, a VM 100 is unaware that it is running over a virtualized platform. As a result, the process of transmitting data from VM 100 (i.e., a transmitting node) to a destination node in a virtualized network 190 involves determining the physical address (e.g., the data link (L2) layer address or the MAC address) associated with the destination node. A mechanism referred to as Address Resolution Protocol (ARP) may be utilized by the VM to determine the physical address for a destination node. If a corresponding network address (e.g., the IP address) for the destination node is available, the transmitting node may find the destination node's physical address by way of referencing an ARP lookup table (not shown in FIG. 1) that includes a mapping between the network address and the respective physical address of the destination node.

Still referring to FIG. 1, if the ARP lookup table does not include a mapping between the known network address of a destination node and the physical address of the destination node, then the transmitting node will have to broadcast a first ARP request to all the nodes in the network 190. As shown, the ARP request is transmitted (e.g., by way of a multicast) from VM 100 by way of a VM Ethernet interface 110 to hypervisor 120 and thereafter to the rest of the nodes in network 190. If the destination node receives the ARP request, the destination node will then submit an ARP reply that includes the physical address for the destination node in the reverse direction as shown.

In an overlay virtual network, the ARP request/reply of the virtual nodes are not broadcasted directly in the physical network, but are processed and sent encapsulated by the hypervisors which represent the only real entities in the physical network. Accordingly, VM 100 in the transmitting node includes the physical address of the destination node in the Ethernet header of the data packet and transmits the data packet which will be processed by hypervisor 120 before being ultimately encapsulated and delivered to the destination node.

Referring to FIG. 2, hypervisor 120 on which VM 100 is running upon receiving the data packet determines that the data packet is meant to be routed to a destination node on a virtual network via the physical network 190. A separate virtual network is implemented on network 190 by way of an overlay mechanism such that traffic communicated among the virtual nodes is encapsulated over the network 190 while routed inside the virtual network.

In network 190, hypervisor 120 utilizes a mechanism (e.g., a virtual network routing table) to find the physical address of the counterpart hypervisor hosting the destination node's VM. If the routing table (not shown) does not include the physical address, then the hypervisor 120 will need to broadcast a second ARP request and update the routing table when it receives the ARP reply that includes the physical address for the hypervisor hosting the destination node.

In a virtualized overlay network, the first ARP request submitted by VM 100 (see FIG. 1) and the second ARP request submitted by hypervisor 120 (see FIG. 2) take place on an ARP lookup miss for each data packet transmission. The double ARP submission and reply process (i.e., the participation of both the VM 100 and the hypervisor 120 in the ARP communication process) may cause unnecessary delay in data transmission and also adversely affect the availability of network bandwidth in network 190. More efficient data transmission methods and systems are desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for data transmission in a data communications network are provided. The method comprises receiving a data packet for transmission, the data packet having a first header portion and a second header portion, wherein the first header portion comprises an identifier indicating that any information in the first header portion is not to be used; and determining destination information comprising at least a physical address of a destination in the data communications network to which the data packet is to be transmitted based on information included in the second header portion.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
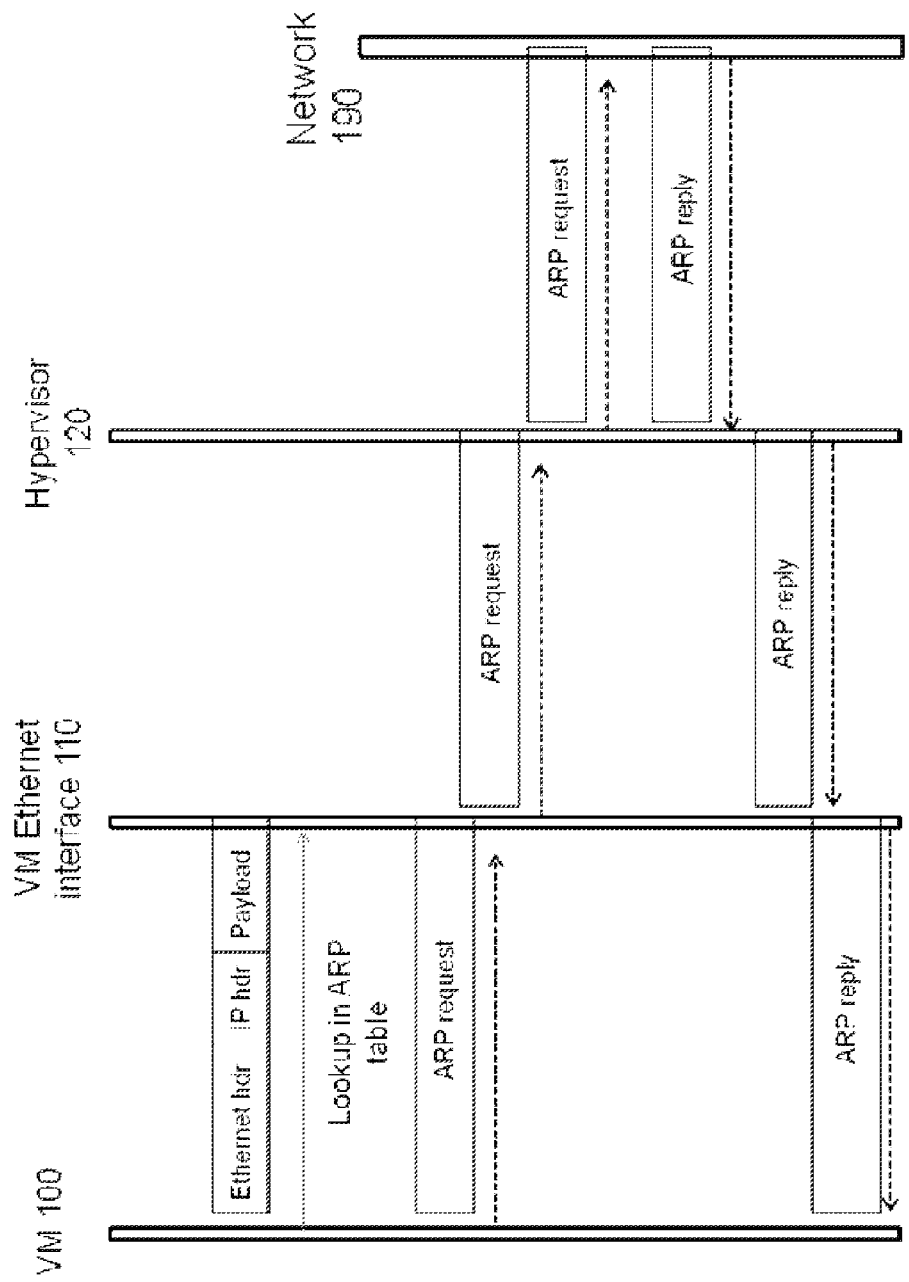
FIGS. 1 and 2 illustrates a block diagram of the processes involved in transmitting data from a first node to a second node in a virtualized computing network.
Figure 2:
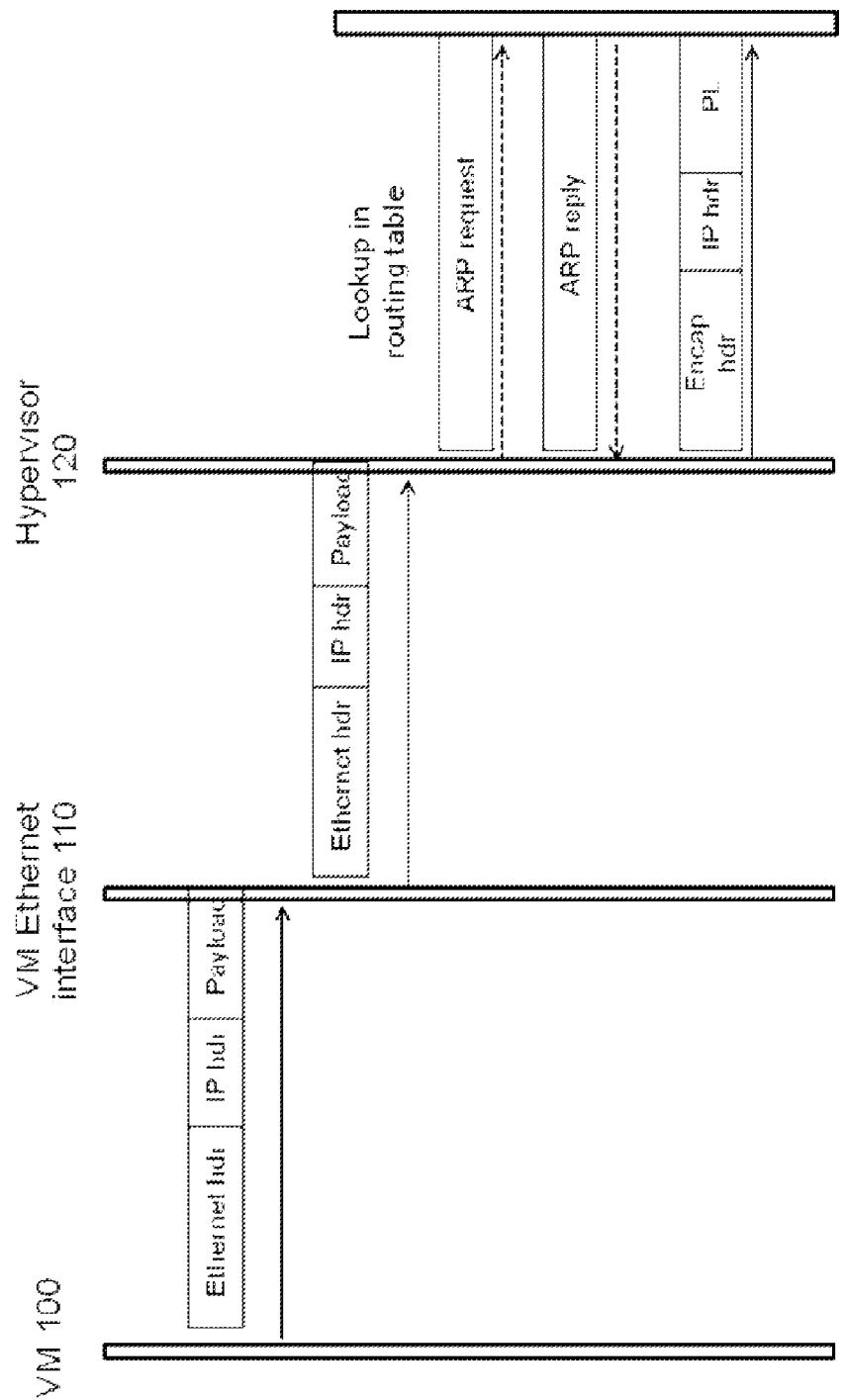
Figure 3:
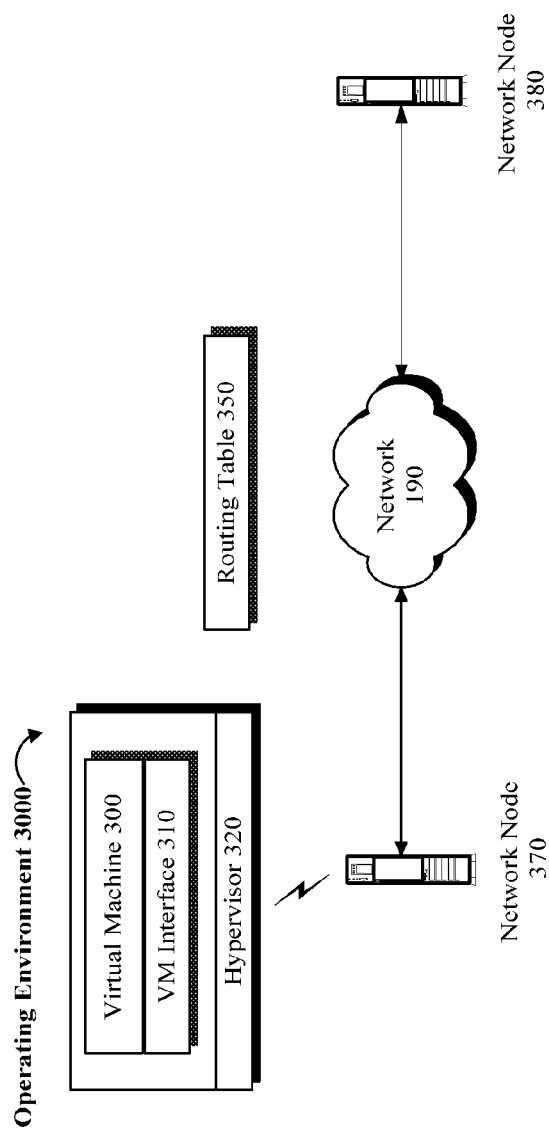
FIG. 3 illustrates an exemplary virtualized computing network with two or more virtual nodes, in accordance with one or more embodiments, in which a hypervisor hosts a virtual machine in at least one node.

Referring to FIG. 3, an exemplary operating environment 3000 is illustrated in which a transmitting network node 370 comprises a hypervisor 320 hosting a virtual machine 300. In accordance with one aspect, network node 370 is connected to destination network node 380 over network 190, wherein network 190 supports a virtualized network environment in which one or more nodes in network 190 are virtual nodes such that a virtual node hosts a virtual machine (VM) that may communicate with other VMs hosted by other virtual nodes in network 190. It is noteworthy that in an overlay virtual network such as that illustrated in FIG. 3, the virtual nodes may not be known nodes in the physical network.

As provided in further detail below, in one implementation, VM interface 310 for VM 300 and the hosting hypervisor 320 may be configured so that the process of network address to physical address conversion for a destination node is performed by hypervisor 320 and not by VM 300. In this implementation, VM 300 is notified that VM 300 is hosted by hypervisor 320 that supports Ethernet offloading, and therefore VM 300 no longer attempts to resolve the network address to physical address conversion.

Figure 4:
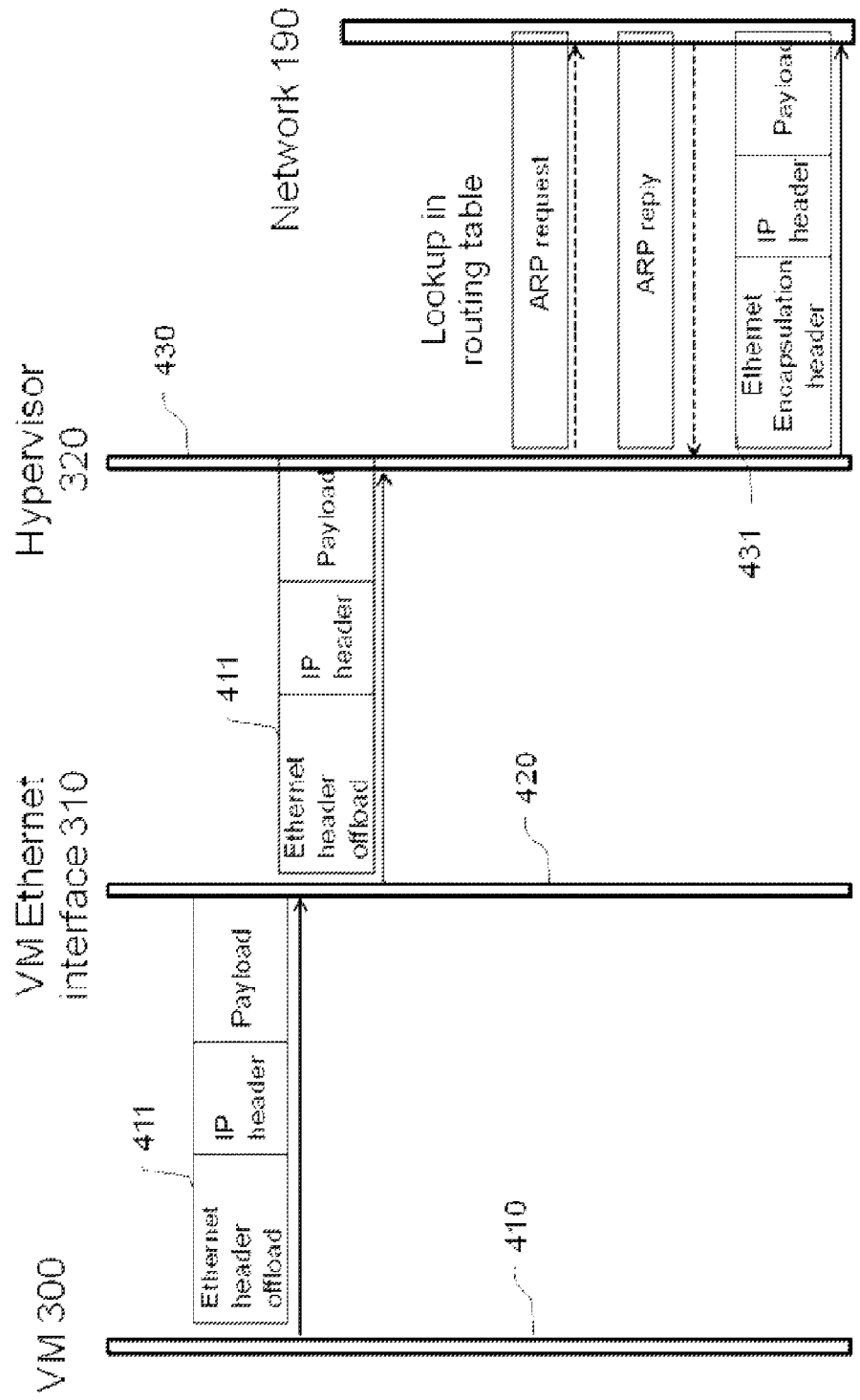
FIG. 4 illustrates a block diagram of an improved process for transmitting data from a first node to a second node in a virtualized computing network, in accordance with one or more embodiments.
Figure 5:
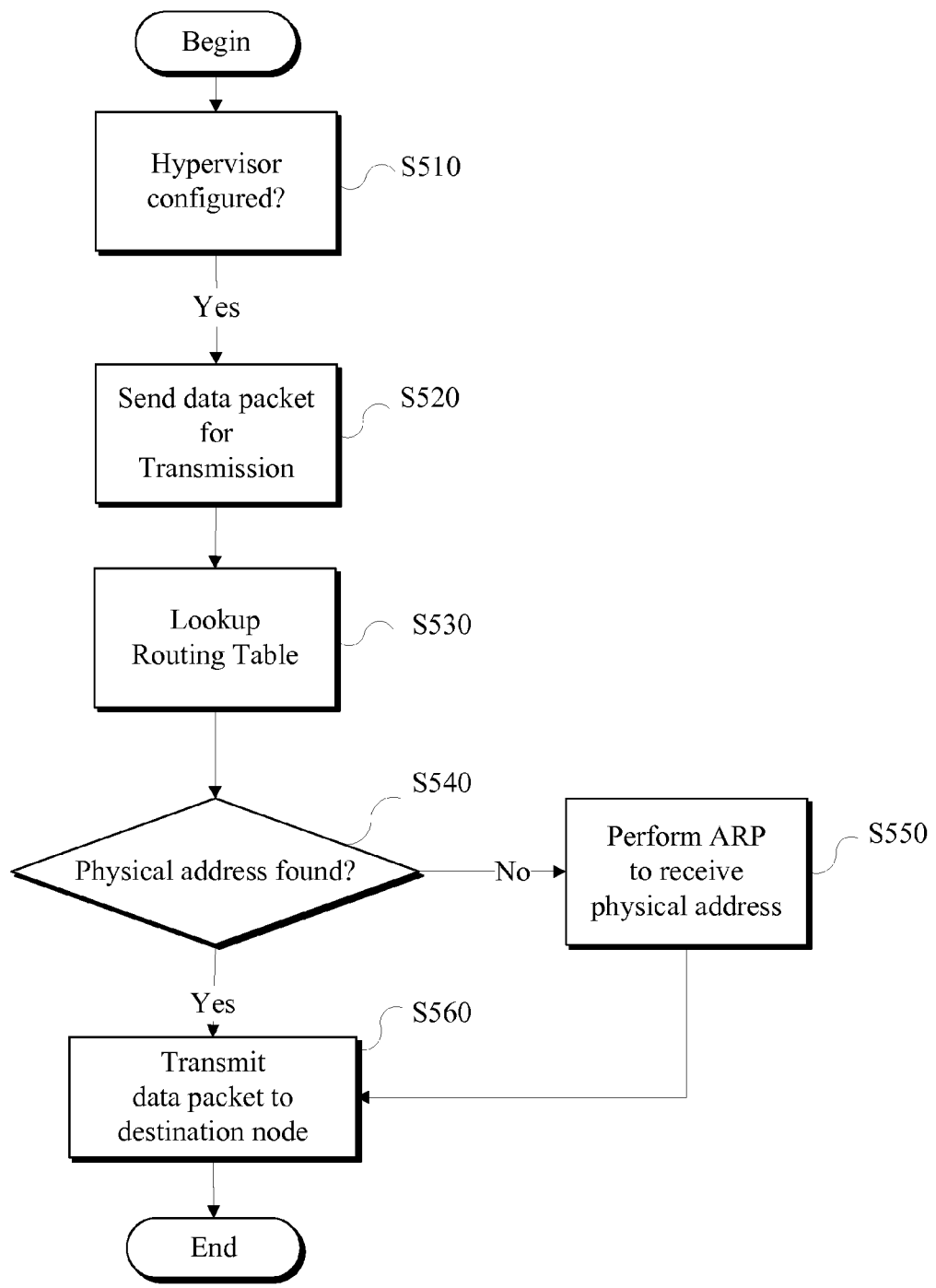
FIG. 5 is a flow diagram of an exemplary method for transmitting data from a first node to a second node in a virtualized computing network, in accordance with one or more embodiments.

Referring also to FIGS. 4 and 5, in accordance with one embodiment, when a network node 370 is initialized (e.g., during boot time or VM instantiation), VM 300 communicates with hypervisor 320 to determine whether hypervisor 320 is configured to manage transmission of data packets where the packet do not include a field (e.g., an Ethernet header) that would have otherwise included the physical address of a target destination node (S510). If the hypervisor 320 supports such configuration (hereafter referred to by way of example, and without limitation, as Ethernet offloading), hypervisor 320 responds accordingly. For example, hypervisor 320 may respond indicating that VM interface 310 is configured as an Ethernet offloading interface, so that VM 300 may begin to communicate with VM interface 310 as an Ethernet offloading interface.

Referring to FIG. 4, in one exemplary implementation, a VM network stack 410 may be modified as paravirtual network stack. Paravirtualizations refers to an environment in which a VM is not completely unaware of the operating platform on which the VM is running. That is, a paravirtualized VM has some level of understanding about the underlying hypervisor or host, so that the VM may change or customize the VM's communication with the hypervisor or the host in a more efficient manner. Accordingly, in one embodiment, when a data packet (e.g., an IP packet in a TCP/IP network having an IP header and a data payload) is ready for transmission, the VM network stack 410 encapsulates the data packet with an Ethernet header offload 411.

Optionally, Ethernet header offload 411 does not include information reflecting the physical destination address for a target destination node 380 in the network 190. Instead, an indicator (e.g., an identifier such as a flag or type data) may be included in Ethernet header offload 411, where the indicator identifies the packet to hypervisor 320 as an Ethernet offloading packet. When the VM Ethernet Interface 310 receives, from VM 300, the data packet with the Ethernet header offload 411, VM Ethernet Interface 310 sends the data packet to hypervisor 320 for transmission (S520).

For example, two VMs (e.g., vA and vB) may be positioned on two physical hosts A and B, respectively. Physical hosts A and B are known entities in the physical network such that when host A receives a packet from vA destined for vb, host A attempts to find physical host B that hosts vB. A lookup is performed in one or more data structures (e.g., lookup or routing tables) that store the respective relationships between a virtual machine and a physical machine that hosts the virtual machine. If the information stored in the data structure maps a given virtual IP address to a physical IP address. For example, the request including vB's virtual address may be submitted to the hosts in network 190 to determine the physical address for the machine that is hosting vB.

Accordingly, the above-noted data structure may be utilized to map between the virtual IP address of a VM and the physical address of a machine that hosts the VM. Such a data structure may be maintained outside of the hypervisor and may cache parts of the mapping. In other words, the hypervisor, upon receiving a VM's packet, performs a location lookup to find out on which physical location a destination VM is hosted. The hypervisor may for example ask an externally maintained system about the location of the destination VM and receive an answer that indicates that the destination VM with a certain virtual IP address is hosted on a physical machine with a certain physical IP address. The answer may be cached in the local location tables inside the hypervisor. Having received the relevant information, the hypervisor encapsulates and sends the packet to the target destination.

Thus, after receiving the data packet having an Ethernet header offload 411, the hypervisor 320 searches a data structure (e.g., a routing table 350) to lookup the physical address of the hypervisor that hosts node 380 (S530). If the search in routing table 350 does not yield a physical address for the destination node 380, the hypervisor 320 sends a request (e.g., an ARP request) to a mechanism or a plurality of nodes in network 190 to receive the physical address for the target destination that hosts node 380 (S540-S550). However, if the search in routing table 350 returns the physical address of the host of the destination node, or else upon receiving the physical address for the host of the destination node, the hypervisor 430 optionally updates the routing table 350 with the received location of the destination node 380 and encapsulate and transmits the data packet to the hypervisor that hosts the destination node 380 as identified by the physical address of the destination node 380 (S540-S560).

In one or more embodiments, the hypervisor 320 may create an Ethernet encapsulation header 431 (see FIG. 4) having the address of a subsequent node or location (e.g., hop) in the physical network. The hypervisor 320 may encapsulate the data packet transmitted from VM 300 by way of VM Ethernet interface 310 with the Ethernet encapsulation header 431, and send the encapsulated data packet over the physical network. It is noteworthy that according to the above provided implementation, the VM 300 does not submit or participate in ARP communication for the purpose of determining the physical address for the destination node 380. Instead, the hypervisor is tasked with the responsibility to find the target physical address and to transfer the data to the proper destination node in network 190.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 6A:
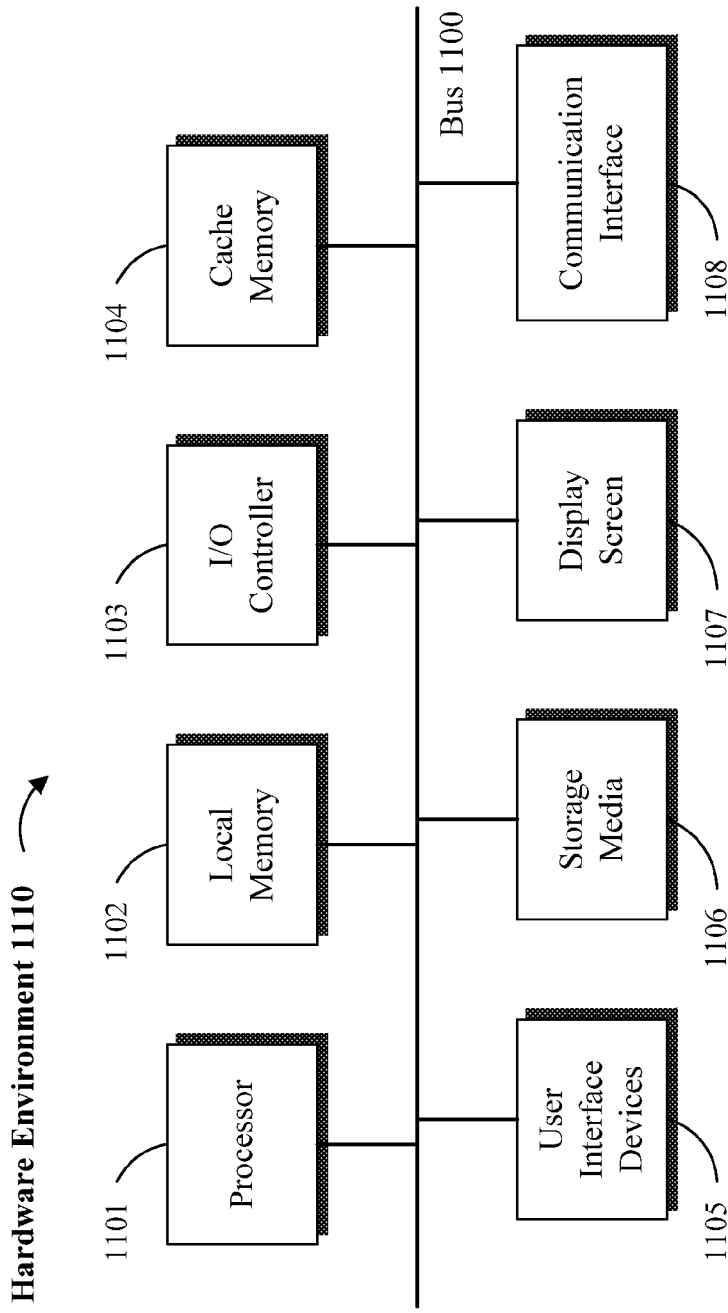
FIGS. 6A and 6B are block diagrams of hardware and software environments in which the disclosed systems and methods may operate, in accordance with one or more embodiments.
Figure 6B:
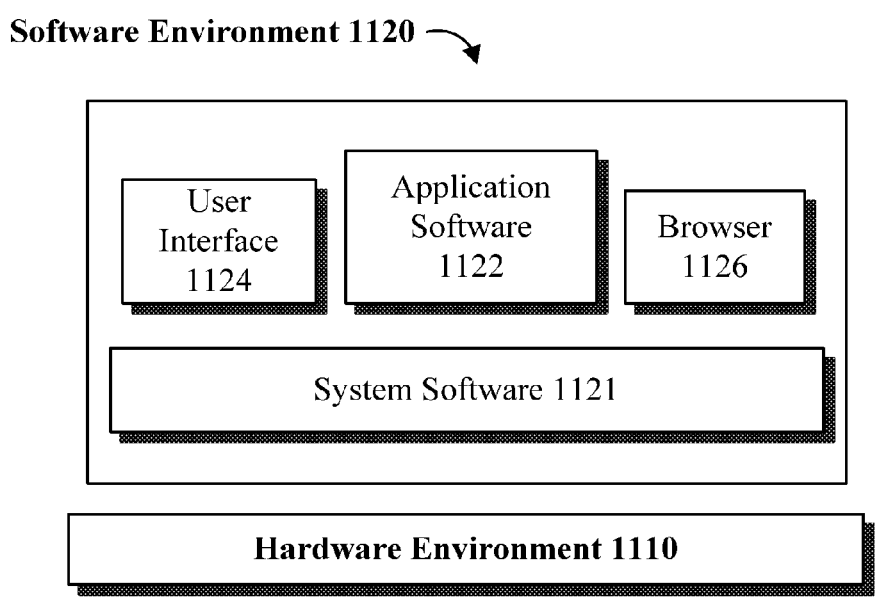

Referring to FIGS. 6A and 6B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 6A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, or transport program code.

A computer readable storage medium may be an electronic, magnetic, optical, electromagnetic, infrared, or semiconductor medium, system, apparatus or device. Examples of a computer readable storage medium may include a semiconductor or solid-state memory, magnetic tape, a removable computer diskette, a random access memory (RAM), a read-only memory (ROM), a rigid magnetic disk, or an optical disk, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 6B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A data transmission method in a data communications network, the method comprising:
   transmitting, by a first virtual machine, a query to a hypervisor, wherein the first virtual machine is a paravirtualized virtual machine;
   determining, by the first virtual machine, that the hypervisor supports Ethernet offloading, comprising the steps of:
      receiving, by the first virtual machine, a response to the query, and
      determining, by the first virtual machine, that an interface is configured as an Ethernet offloading interface based, at least in part, on the response to the query;
   receiving, by the hypervisor, a data packet, from the first virtual machine, for transmission to a second virtual machine, the data packet having a first header portion and a second header portion, wherein the first header portion comprises an identifier indicating that the data packet is an Ethernet offloading packet;
   based, at least in part, on information included in the second header portion, determining, by the hypervisor, a physical address in the data communications network, wherein (i) the physical address is associated with the second virtual machine, and (ii) the first virtual machine does not participate in determining the physical address;
   generating, by the hypervisor, an Ethernet encapsulation header based, at least in part, on the physical address;
   encapsulating, by the hypervisor, the data packet with the Ethernet encapsulation header to produce an encapsulated data packet; and
   sending, by the hypervisor, the encapsulated data packet to the second virtual machine over the data communications network.

2. The method of claim 1, wherein the physical address that is associated with second virtual machine is retrieved from a data structure that is used to store a relationship between at least the second virtual machine and a host machine on which the second virtual machine is executed.

3. The method of claim 1, wherein the physical address that is associated with second virtual machine is determined based on submitting an address resolution protocol (ARP) request to a plurality of host machines in the data communications network.

4. The method of claim 2, wherein the data structure is a routing table.

5. The method of claim 1, wherein the physical address that is associated with second virtual machine is a physical address associated with a next hop in the data communications network.

6. The method of claim 1 wherein the second header portion comprises an internet protocol (IP) address.

7. The method of claim 2 wherein the host machine is a known node in the data communications network.

8. A data transmission system in a data communications network, the system comprising:
   one or more computer processors;
   one or more tangible computer readable storage devices;
   program instructions stored on the one or more tangible computer readable storage devices media for execution by at least one of the one or more processors, the program instructions comprising:
      program instructions to transmit, by a first virtual machine, a query to a hypervisor, wherein the first virtual machine is a paravirtualized virtual machine;
      program instructions to determine, by the first virtual machine, that the hypervisor supports Ethernet offloading, comprising:
         program instructions to receive, by the first virtual machine, a response to the query, and
         program instructions to determine, by the first virtual machine, that an interface is configured as an Ethernet offloading interface based, at least in part, on the response to the query;
      program instructions to receive, by the hypervisor, a data packet, from the first virtual machine, for transmission to a second virtual machine, the data packet having a first header portion and a second header portion, wherein the first header portion comprises an identifier indicating that the data packet is an Ethernet offloading packet;
      program instruction to, based, at least in part, on information included in the second header portion, determine, by the hypervisor, a physical address in the data communications network, wherein (i) the physical address is associated with the second virtual machine, and (ii) the first virtual machine does not participate in determining the physical address;
      program instructions to generate, by the hypervisor, an Ethernet encapsulation header based, at least in part, on the physical address;

program instructions to encapsulate, by the hypervisor, the data packet with the Ethernet encapsulation header to produce an encapsulated data packet; and program instructions to send, by the hypervisor, the encapsulated data packet to the second virtual machine over the data communications network.

9. The system of claim 8, wherein the physical address that is associated with second virtual machine is retrieved from a data structure that is used to store a relationship between at least the second virtual machine and a host machine on which the second virtual machine is executed.

10. The system of claim 8, wherein the physical address that is associated with second virtual machine is determined based on submitting an address resolution protocol (ARP) request to a plurality of host machines in the data communications network.

11. The system of claim 9, wherein the data structure is a routing table.

12. The system of claim 8, wherein the physical address that is associated with second virtual machine is a physical address associated with a next hop in the data communications network.

13. A computer program product comprising:
a tangible computer readable storage device and program instructions stored on the tangible computer readable storage device, the program instructions comprising:
program instructions to transmit, by a first virtual machine, a query to a hypervisor, wherein the first virtual machine is a paravirtualized virtual machine;
program instructions to determine, by the first virtual machine, that the hypervisor supports Ethernet offloading, comprising:
program instructions to receive, by the first virtual machine, a response to the query, and
program instructions to determine, by the first virtual machine, that an interface is configured as an Ethernet offloading interface based, at least in part, on the response to the query;
program instructions to receive, by the hypervisor, a data packet, from the first virtual machine, for transmission to a second virtual machine, the data packet having a first header portion and a second header portion, wherein the first header portion comprises an identifier indicating that the data packet is an Ethernet offloading packet;
program instruction to, based, at least in part, on information included in the second header portion, determine, by the hypervisor, a physical address in the data communications network, wherein (i) the physical address is associated with the second virtual machine, and (ii) the first virtual machine does not participate in determining the physical address;
program instructions to generate, by the hypervisor, an Ethernet encapsulation header based, at least in part, on the physical address;
program instructions to encapsulate, by the hypervisor, the data packet with the Ethernet encapsulation header to produce an encapsulated data packet; and
program instructions to send, by the hypervisor, the encapsulated data packet to the second virtual machine over the data communications network.

14. The computer program product of claim 13, wherein the physical address that is associated with second virtual machine is retrieved from a data structure that is used to store a relationship between at least the second virtual machine and a host machine on which the second virtual machine is executed.

15. The computer program product of claim 13, wherein the physical address that is associated with second virtual machine is determined based on submitting an address resolution protocol (ARP) request to a plurality of host machines in the data communications network.

16. The computer program product of claim 14, wherein the data structure is a routing table.

17. The computer program product of claim 13, wherein the physical address that is associated with second virtual machine is a physical address associated with a next hop in the data communications network.

18. The computer program product of claim 13, wherein the second header portion comprises an internet protocol (IP) address.

19. The computer program product of claim 14, wherein the host machine is a known node in the data communications network.

20. The system of claim 8, wherein the second header portion comprises an internet protocol (IP) address.

* * * * *